United States Patent [19]

Shak

[11] Patent Number: 4,746,893
[45] Date of Patent: May 24, 1988

[54] PRESSURE TRANSDUCER WITH SEALED CONDUCTORS

[75] Inventor: Peter J. Shak, Hoffman Estates, Ill.

[73] Assignee: Motorola, Inc., Schaumburg, Ill.

[21] Appl. No.: 902,338

[22] Filed: Aug. 29, 1986

Related U.S. Application Data

[63] Continuation-in-part of Ser. No. 696,933, Jan. 31, 1985, Pat. No. 4,617,606.

[51] Int. Cl.⁴ .............................................. G01L 1/22
[52] U.S. Cl. ............................................ 338/5; 338/4; 73/725; 73/726
[58] Field of Search ................. 338/2, 3, 4, 5; 73/706, 73/707, 718, 719, 725, 726

[56] References Cited

U.S. PATENT DOCUMENTS

| | | | |
|---|---|---|---|
| 3,352,157 | 11/1967 | Seegmiller | 73/398 |
| 3,969,816 | 7/1976 | Swengle, Sr. et al. | 29/625 |
| 4,178,621 | 12/1979 | Simonelic et al. | 361/283 |
| 4,380,041 | 4/1983 | Ho | 361/283 |
| 4,384,899 | 5/1983 | Myers | 148/1.5 |
| 4,410,871 | 10/1983 | Mallon et al. | 338/5 |
| 4,414,851 | 11/1983 | Maglic | 73/706 |
| 4,445,383 | 5/1984 | Binder et al. | 73/718 |
| 4,633,212 | 12/1986 | Johnson | 338/5 X |

OTHER PUBLICATIONS

A Micropower IC for a Biomedical Pressure Transducer by M. J. S. Smith, Margaret A. Prisbe, L. Bowman and J. D. Meindl, of Stanford University, Sep. 1985, pp. 42–45.

A Monolithic Capacitive Pressure Sensor with Pulse-Period Output by Craig S. Sander, James W. Knutti, and James D. Meindle, from IEEE Transactions on Electron Devices, vol. ED-27, No. 5, May 1980, pp. 927–930.

Primary Examiner—E. A. Goldberg
Assistant Examiner—M. M. Lateef
Attorney, Agent, or Firm—Phillip H. Melamed

[57] ABSTRACT

A pressure transducer (10; 10') having a silicon diaphragm (14; 14') and an insulating glass base (11; 11'). Surfaces (16, 12; 16', 12') of the diaphragm and glass base are anodically bonded together to form a hermetic seal for an internal reference cavity (24; 24') therein and also to provide hermetic protection for critical areas (70, 77; 70', 80, 81) on the silicon diaphragm. A plurality of semiconductor components are synthesized in an area (70; 70') in the silicon diaphragm. A plurality of conductors (71-73; 71'-73') are embedded (sealed) in the glass base so as to provide external electrical access to the semiconductor components without disrupting the hermetic seal provided between the silicon diaphragm and the glass base. This occurs by virtue of embedded pins (71-73; 71'-73') in the glass base extending between top and bottom surfaces (12, 13; 12', 13') of the glass base with flat ends of these pins, which ends are coplanar with the base surfaces to be anodically bonded, forming a silicon gold eutectic with bonding pads (77; 77') on the silicon diaphragm during anodic bonding. The bonding pads are within outer peripheral areas (18; 18') of a bottom surface (16; 16;) of the silicon diaphragm that are hermetically bonded to outer peripheral areas (22; 22') of a top surface (12; 12') of the glass base during the anodic bonding process.

12 Claims, 3 Drawing Sheets

PRESSURE TRANSDUCER WITH SEALED CONDUCTORS

CROSS REFERENCES TO RELATED APPLICATIONS

The present application is a continuation-in-part application of copending U.S. Pat. application No. 696,933, filed Jan. 31, 1985, now U.S. Pat. No. 4,617,606 entitled, "Capacitive Pressure Transducer," by Peter J Shak and Roland K. Ho, having the same assignee as the present invention. Preferably, the present claimed invention is implemented by use of the improved manufacturing process described in copending U.S. Pat. application No. 878,453, filed June 25, 1986, entitled, "Post Seal Etching of Transducer Diaphragm," by Donald Myers and Ruta Venclovas, having the same assignee as the present invention.

BACKGROUND OF THE INVENTION

The present invention is related to the field of pressure transducers, and more particularly, to capacitive or piezoresistive pressure transducers in which sensed pressure causes deflection of a pressure displaceable diaphragm so as to provide a predetermined capacitance or resistance variation of a pressure sensing element. This capacitance or resistance variation is then coupled to additional circuit electronics so as to provide an electrical signal representative of the sensed pressure. The combination of the pressure transducer and any additional external electronics is typically referred to as a "pressure sensor."

In pressure sensors utilizing either capacitive or resistive pressure transducers, typically problems have occurred with regard to providing a highly reliable interface connection between the actual pressure sensing element and the associated electronics. In some prior pressure transducers metallized vias or openings in a base substrate have been utilized to provide the interface connection between a pressure sensing capacitor element and additional external electronics. U.S. Pat. No. 4,384,899 to Myers illustrates such a configuration. In some instances, pins sealed in the base of a pressure transducer have been utilized to provide the interface connection between a pressure sensing element and external electronics.

Some pressure sensors have proposed utilizing a silicon diaphragm as the pressure sensing element and incorporating a plurality of semiconductor components on the silicon diaphragm wherein these components comprise at least some of the previously external electronics that respond to the capacitive or resistive change produced by deflection of the pressure sensing diaphragm. In such previously proposed structures, typically the silicon diaphragm is anodically bonded to a glass base. Preferably, the anodic bonding occurs in accordance with the manufacturing technique illustrated in U.S. Pat. No. 4,384,899 to Myers. However, generally in such sensors the input and output connections to the electronics synthesized on the silicon diaphragm are implemented by requiring conductor paths to extend laterally across anodically bonded areas of the diaphragm and glass base to external bonding pads provided on the diaphragm outside of the anodically bonded area. These lateral conductor paths inherently degrade the reliability of the hermetic seal between the diaphragm and the glass base which is intended to be provided by the anodic bonding process. Since the hermetic seal reliability is compromised, a less reliable pressure sensor is provided. This hermetic seal is used to protect the integrity of an interior cavity of the transducer in which a reference pressure is provided, and the seal also protects any interface connections formed between the diaphragm and base within the anodically-bonded area. Also, typically additional manufacturing steps, after anodic bonding, are required to provide electrical connection leads to the bonding pads.

SUMMARY OF THE INVENTION

An object of the present invention is to provide an improved pressure transducer which overcomes the above-noted problems which exist when pressure sensing electronics, which operate in conjunction with a pressure sensing electrical element on a diaphragm, are synthesized on additional areas of the diaphragm.

A more particular object of the present invention is to provide either a capacitive or piezoresistive pressure transducer in which a more reliable external connection is provided to the transducer which includes a plurality of semiconductor components synthesized on a pressure sensing diaphragm.

In one embodiment of the present invention, a pressure transducer is provided. The pressure transducer comprises: a nonconductive base having external top and bottom surfaces, said base top surface having a central area effectively substantially surrounded by nonconductive planar portions of said base top surface; a silicon diaphragm having top and bottom surfaces with said diaphragm bottom surface joined to said base top surface surrounding portions, a recessed portion of one of said diaphragm bottom surface and said base top surface spaced apart from and facing the other of said diaphragm bottom surface and said base top surface, a portion of said silicon diaphragm forming at least part of a pressure sensing element movable with respect to said base top surface in response to sensed pressure variations, planar portions of said diaphragm bottom surface and said surrounding planar portions of said base top surface being peripheral to said recessed portion and being anodically bonded together; a plurality of semiconductor components, which components respond to changes of said pressure sensing element provided in response to sensed pressure, synthesized in an area of said silicon diaphragm and electrically connected to a plurality of bonding pads on said silicon diaphragm bottom surface; and a plurality of conductors, each sealed in said base and extending from at least said base top surface surrounding portions bonded to said diaphragm to said base bottom surface, flat end portions of each of said conductors effectively coplanar with said base top surface surrounding portions and being connected to and contacting associated ones of said pads on said silicon diaphragm, thereby providing external access to said semiconductor component bonding pads from said base bottom surface via said conductors sealed in said base.

Basically, the present invention contemplates providing hermetically sealed conductors in the base substrate so as to provide external access to the plurality of semiconductor components synthesized on the diaphragm by virtue of external connections provided on the base bottom surface. This eliminates the need for having conductor paths which extend laterally across the interface between the anodically bonded silicon diaphragm and glass base to the external ambient atmosphere surrounding the pressure transducer. With the present invention, the peripheral bonded portions of the diaphragm and glass substrate remain intact rather than being breached by the passage of lateral conductors to pads in the ambient atmosphere surrounding the pressure transducer.

The pressure transducer of the present invention can comprise either a capacitive or piezoresistive pressure transducer, and preferably the conductors which are sealed in the base comprise solid pins. Preferably these pins have a coating of gold on the flat end portions thereof so as to assist in forming a silicon gold eutectic, during the anodic bonding process, between the pins and metallization pads provided on the silicon diaphragm. Therefore, preferably the electrical and mechanical connections between the conductor pins and the silicon diaphragm are formed simultaneously during the anodic bonding process which process also hermetically seals peripheral portions of the diaphragm bottom surface to peripheral portions of the top surface of the glass base. This eliminates the need for any additional manufacturing process steps to provide electrical connections to the bonding pads.

The above advantages of the present invention, as well as additional aspects thereof, can best be understood by referring to the subsequent description of the preferred embodiments of the present invention.

BRIEF DESCRIPTION OF THE DRAWINGS

For a more complete understanding of the present invention, reference should be made to the drawings in which.

DESCRIPTION OF THE PREFERRED EMBODIMENTS

Figure 1:
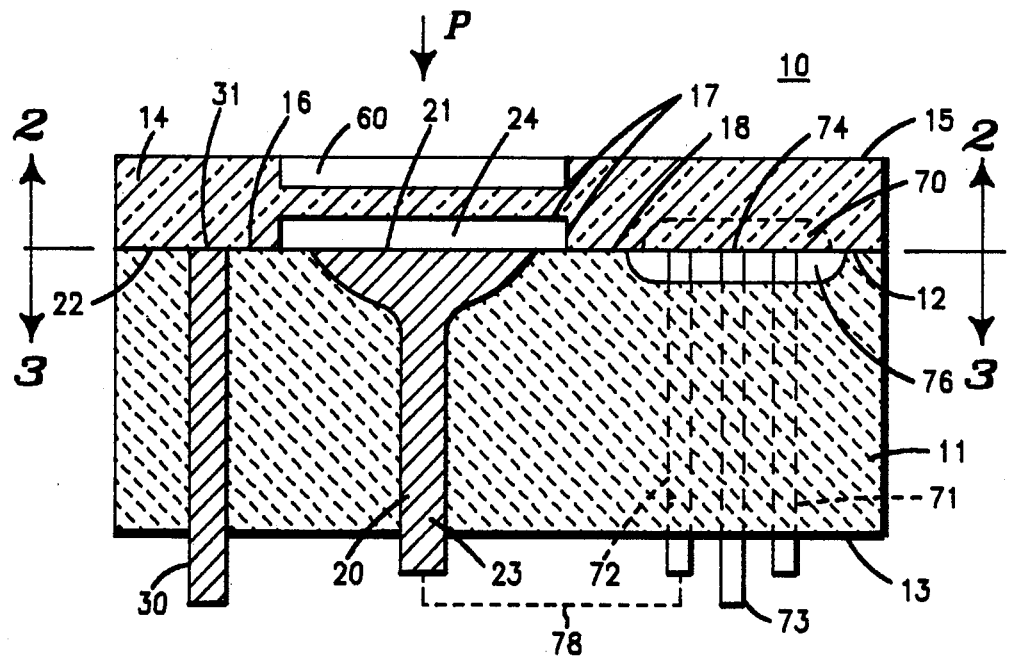
FIG. 1 is a cross-sectional view of a pressure transducer.

FIG. 1 illustrates a cross-sectional view of a capacitive pressure transducer 10. The transducer comprises a nonconductive base (substrate) 11, preferably made of glass, having an external top surface 12 and a spaced-apart and parallel external bottom surface 13. The transducer 10 also includes a silicon diaphragm 14 which is preferably suitably doped, or will be suitable biased, to render it conductive during a pressure sensing function such that at least a portion of the diaphragm will function as one plate of a pressure sensing capacitive element. The diaphragm 14 has an external top surface 15 and a bottom surface 16. The bottom surface 16 has a central recessed portion 17 which is surrounded by coplanar nonrecessed portions 18 of the diaphragm bottom surface 16 that are peripheral to the recessed portion 17. It is contemplated that the recessed portion 17 of the diaphragm will effectively function as a capacitor electrode of the capacitive pressure transducer 10.

A capacitive electrode 20 is embedded in and bonded to said base 11 and has a top external surface 21 which forms part of the base external surface 12. The electrode top external surface 21 is preferably planar and corresponds to a central area of the base top surface 12 which is effectively substantially surrounded by nonconductive planar portions 22 of the base top surface 12. These planar nonconductive portions 22 are coplanar with respect to each other. The coplanar nonrecessed portions 18 of the diaphragm bottom surface 16 are bonded by anodic bonding techniques to the coplanar surrounding nonconductive portions 22 of the base top surface 12. This effectively bonds the silicon diaphragm 14 to the base 11 and provides a substantially hermetic seal for the bonded portions. The diaphragm 14 is substantially electrically isolated from the capacitor electrode 20.

The electrode top external surface 21 is positioned facing and spaced apart from the diaphragm recessed portion 17, and the electrode top surface 21 is coplanar with the base top surface surrounding nonconductive coplanar portions 22. The electrode 20 preferably comprises a preformed metallic component which has at least portions hermetically embedded in the base substrate 11. The electrode 20 has a conductive projecting portion 23, effectively integral with the electrode top external surface 21, hermetically embedded within the base 11 and effectively extending from the electrode top surface 21 through the base 11 to at least the base bottom surface 13. This provides an integral hermetically sealed feedthrough between the electrode top surface 21 and the bottom surface 13 of the nonconductive base 11.

Alternatively, the electrode 20 can comprise a film metallization on the top surface 12 of the base 11 with a metallized via (opening) comprising the conductive projection 23. This metallized via could then be subsequently sealed, if necessary, by a solder seal applied to the end of the projection 23 on the base bottom surface 13. This would also provide a hermetically-sealed conductor as would be the case if a solid pin were used for electrode 20. It should also be noted that the conductive projection 23 may be hollow so as to permit external access to an internal reference cavity 24 formed by the recessed portion 17 and the top surface 12 of the base substrate. In addition, the conductive projecting portion 23 may either extend beyond the base bottom surface 13 or merely end substantially coplanar therewith.

From the above noted structure it is apparent that the silicon diaphragm 14 has its bottom surface 16 joined to the top surface surrounding portions 22 of the base 11. More specifically, the planar portions 18 of the diaphragm bottom surface 16 which are peripheral to the recessed portion 17 are anodically bonded to the surrounding planar portions 22 of the base top surface 12 wherein these surrounding planar portions 22 are also located peripheral to the recessed portion 17. The recessed portion 17 of the diaphragm bottom surface 16 is spaced apart from and facing the base top surface 12 which includes the surface 21. However, it should be noted that in other embodiments a recessed portion may be provided in the base top surface 12 rather than in the diaphragm bottom surface 16 without substantially affecting the operation of the present claimed invention. Either of these two configurations results in a portion of the silicon diaphragm 14 forming at least part of a pressure sensing element that is movable with respect to the base top surface in response to sensed pressure variations. These pressure variations comprise measuring the differential pressure that exists between an external pressure P applied external to the pressure transducer 10 as opposed to the pressure contained in the reference cavity 24.

In FIG. 1, a preformed metallic conductor pin 30 is hermetically embedded in the base 11 and extends between the base top surface 12 and at least the base bottom surface 13. The metallic conductor 30 has a top end portion 31 which is coplanar with the base top surface coplanar portions 22 and the electrode top external surface 21. The end portion 31 of the conductor 30 is electrically and mechanically connected to the conductive silicon diaphragm 14 and effectively provides a base bottom feedthrough connection from the base bottom surface 13 to the silicon diaphragm 14. Preferably, the electrical connection between the conductor 30 and the diaphragm 14 is formed by the end portion 31 being gold plated and forming a silicon gold eutectic with the diaphragm during the anodic bonding process which bonds the diaphragm 14 to the base 11. Preferably, this bonding process comprises the anodic bonding process for pressure transducers disclosed in U.S. Pat. No. 4,384,899 to Myers. Preferably, the electrode 20 and conductor 30 comprise kovar or tungsten, or any other suitable nickel alloy which is gold plated.

The above discussed configuration for the transducer 10 provides external electrical access from the base bottom surface to both the capacitive electrode 20, mounted in the base 11, and the capacitive electrode formed by the silicon diaphragm 14. In each situation, external access to the capacitor electrodes is provided from the base bottom surface 13 of the base 11. As was the case with the integral projecting portion 23 of the electrode 20, the metallic conductor 30 may comprise a metallized via (opening) wherein the end portion 31 could comprise a conductive metallization provided on the top surface 12 of the base 11.

It should be noted that because an anodic bonding process is contemplated as joining the diaphragm 14 to the base 11, this will effectively hermetically seal the internal cavity 24 to thereby provide a predetermined reference pressure within this cavity. Of course, if the electrode 20 is hollow, then a differential transducer can be provided. If the electrode 20 is hollow, then it could be sealed after the anodic bonding process so as to store any desired predetermined reference pressure within the cavity 24.

The basic operation of the pressure transducer 10 is that in response to application of the external pressure P applied as shown in FIG. 1, the recessed portion 17 of the diaphragm 14 will deflect toward the base 11 and thereby change the capacitance which exists between the electrode 20 and the diaphragm 14. Capacitance variation of this pressure sensitive element, the capacitor formed by the electrode 20 and the diaphragm recessed portion 17, is then generally utilized by monitoring circuitry to provide an electrical signal indicative of the pressure P applied to the transducer 10.

As illustrated in FIG. 1, the top surface 15 of the silicon diaphragm 14 preferably has an additional recessed portion 60 which is substantially coextensive with the bottom surface recessed portion 17. In this manner, a more sensitive pressure transducer can be provided by minimizing the thickness of the portion of the silicon diaphragm which is intended for deflection in response to applied pressure. This is achieved without substantially jeopardizing the ruggedness of the silicon diaphragm 14 prior to its anodic bonding to the base substrate 11. However, it should be noted that preferably the manufacturing process disclosed in copending U.S. Pat. application No. 878,453, filed June 25, 1986 is utilized in manufacturing the pressure transducer 10. This copending application discusses a post-seal etching of the transducer diaphragm which essentially involves initially bonding the diaphragm and base, and then subjecting the top surface 15 of the diaphragm to an etching process so as to selectively adjust the sensitivity of the pressure transducer 10.

In FIG. 1, a plurality of active and passive semiconductor components are synthesized in an area 70 which is part of the silicon diaphragm 14. These components can be synthesized utilizing standard semiconductor manufacturing technology prior to the bonding of the diaphragm to the base substrate. The present invention involves providing external electrical connection to these components without disrupting the hermetic bonding seal provided between the diaphragm 14 and the base substrate by the anodic bonding process. The plurality of semiconductor components in the area 70 essentially correspond to the prior external electronic circuitry which responded to capacitance changes provided in response to sensed pressure and provided an electrical signal in response thereto. External connection to the components in the area 70 is provided by a plurality of conductive metallic pins 71, 72 and 73 which are hermetically embedded in the base 11 and function similarly to the conductive metal pin 30.

Preferably, there will be no contact between the base top surface 12 and a critical surface area 74 which is part of the planar portions 18 of the diaphragm bottom surface 16 that are peripheral to the recessed portion 17. Beneath this critical surface area 74 the plurality of electrical components are provided in the area 70. Electrical connection is made to the semiconductor components in the area 70 by virtue of providing conductive paths 75, shown in FIG. 2, which extend from inside to outside this critical surface area 74 wherein these paths 75 are provided on the bottom surface 16 of the silicon diaphragm 14. Connection to the conductive paths 75, and, therefore, to the components within the area 70, is provided by virtue of the embedded conductor pins 71-73 which are connected to bonding pads 77 formed at the end of the paths 75. The bonding pads are on the diaphragm bottom surface 16 but outside of the critical area 74.

A recessed portion 76 of the base top surface 12 is provided wherein this recessed portion 76 is coextensive with, and is actually somewhat larger in area than, the critical silicon diaphragm bottom surface area 74. The connection between the pins 71-73 and the pads 77 is again implemented by virtue of forming a silicon gold eutectic during the anodic bonding process. The ends of the pins 71-73 have been ground flat so that they are substantially coplanar with the base top surface 12. More specifically, the flat ends of the pins 71-73 are coplanar with respect to the base top surface portions 22 bonded to the diaphragm bottom surface portions 18. The embedded pins 71 through 73 are each hermetically sealed in the base 11 and extend from at least the base top surface surrounding portions 22 to the base bottom surface 13, and, therefore, these pins provide external access to the semiconductor components in the area 70 from the base bottom surface 13. The flat ends of the pins 71-73 are positioned laterally outside of the diaphragm critical area 74 and outside the base top surface recessed portion 76. As was the case with the electrode 20, the pins 71-73 and electrode 30, could comprise metallized vias (openings) which are sealed after the anodic bonding process. This would still result in hermetic sealed conductors in the base providing feed-through connections in the same manner as the pins 71-73.

Figure 2:
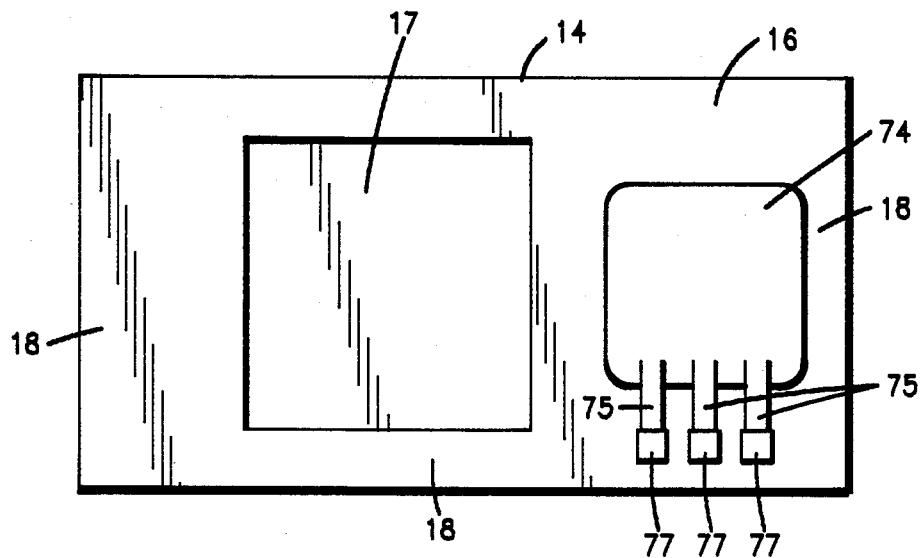
FIG. 2 is a bottom plane view of the diaphragm of the FIG. 1 transducer taken along lines 2—2 in FIG. 1.
Figure 3:
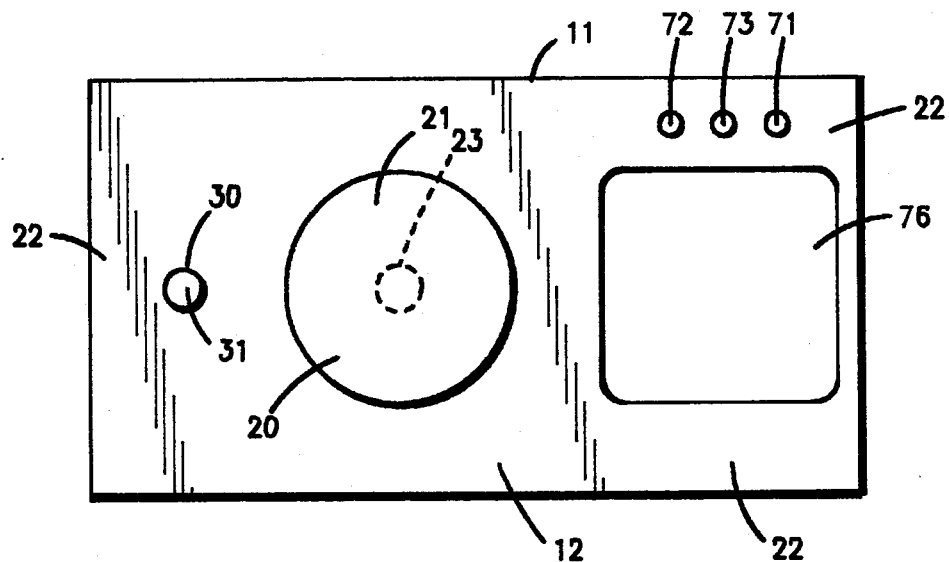
FIG. 3 is a top plane view of a base subassembly for the transducer shown in FIG. 1 taken along lines 3—3 in FIG. 1.

It should be noted that the operation of the pressure transducer 10 illustrated in FIGS. 1 through 3 is also described in copending U.S. Pat. application No. 696,933, filed Jan. 31, 1985, wherein this copending application is directed to a different claimed invention. In the present case, the claims are directed to the feature of providing electrical connection to the plurality of semiconductor components within the area 70 without disrupting the hermetic seal provided by the anodic bonding process between the diaphragm and the base. Also the connection to the semiconductor components in area 70 occurs simultaneously and without any additional process step during the anodic bonding process.

In prior circuits, connections to semiconductor components synthesized in a portion of the silicon pressure sensing diaphragm was provided either by utilizing conventional wire bonding techniques or by requiring conductive metallizations to be deposited, wherein these metallizations extended laterally between externally accessible bonding pads on the diaphragm or base and the components in the area 70. Thus, these metallizations extended across anodically bonded portions of the diaphragm and glass base and emerged in the ambient atmosphere surrounding the transducer. This degraded the integrity of the hermetic seal formed by the anodic bonding process. This deficiency is eliminated by the present invention since the bonding pads for the semiconductor components are provided on the bottom surface of the silicon diaphragm, and hermetic feed-through connections through the base 11 are provided directly to these bonding pads wherein these feed-through conductors extend from the base top surface portions which are bonded to the diaphragm to the base bottom surface. Because of this configuration, it is not necessary to provide lateral extending conductor metallizations to ambient atmosphere on either the base or the silicon diaphragm wherein these conductor metallizations laterally extend beyond the surrounding portions of the silicon diaphragm 14 that are anodically bonded to the top surface 12 of the base substrate 11.

It should be noted that with the present configuration illustrated in FIGS. 1 through 3, it may not be necessary to provide the conductor pin 30, since a direct connection to the electrode formed by the silicon diaphragm can be provided internal to the silicon diaphragm and effectively extend between the recessed portion 17 and components within the area 70. However, preferably a conductor path comprising a connection between one of the pins 71 through 73 and the electrode 20 should be provided, wherein such a conductor path is illustrated by the path 78 shown in FIG. 1. This is required such that the components within the area 70 will be connected to both electrodes of the pressure variable capacitor.

Figure 4:
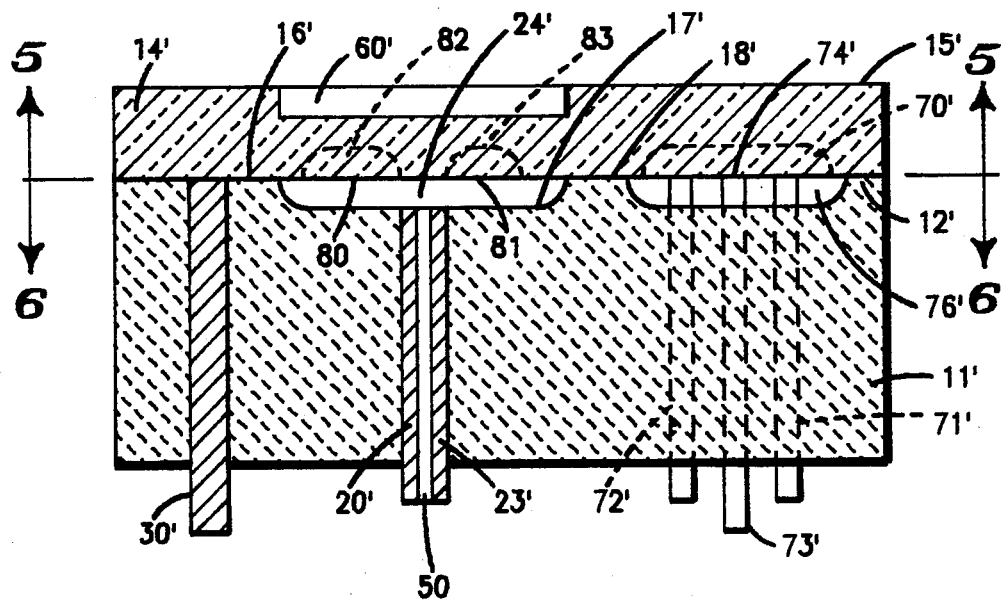
FIG. 4 is a cross-sectional view of another pressure transducer embodiment.
Figure 5:
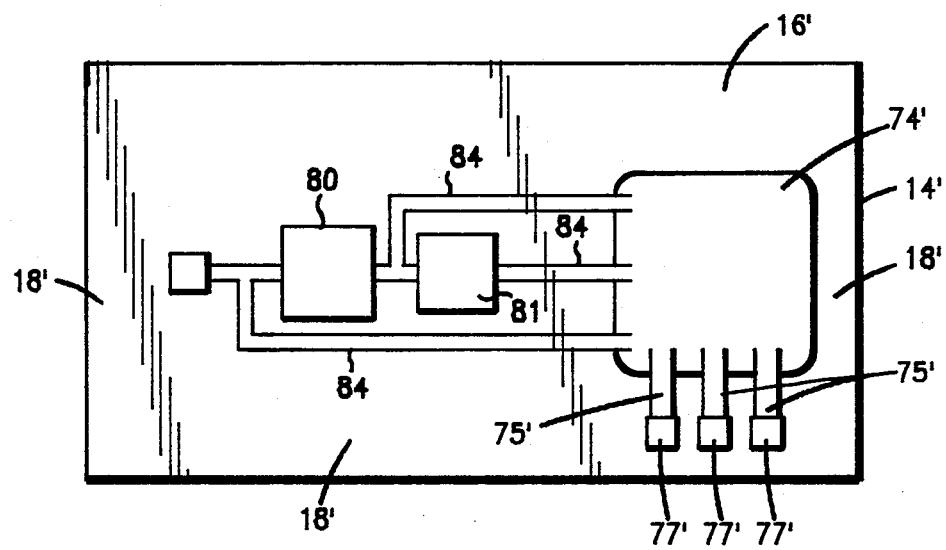
FIG. 5 is a bottom plane view of the diaphragm of the FIG. 4 transducer taken along lines 5—5 in FIG. 4.
Figure 6:
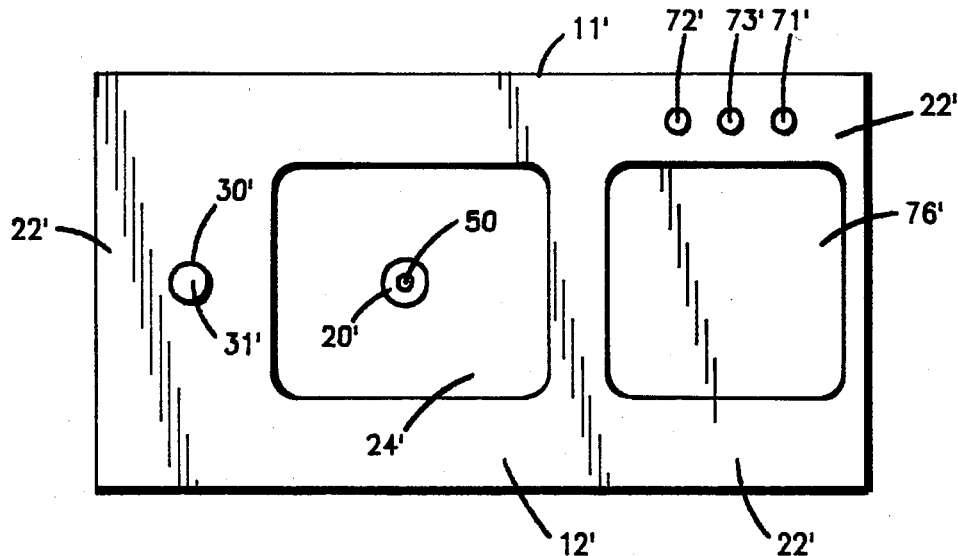
FIG. 6 is a top plane view of the base subassembly of the pressure transducer shown in FIG. 4 taken along lines 6—6 in FIG. 4.

Referring now to FIGS. 4 through 6, another embodiment of the present invention is illustrated. In FIG. 4 a piezoresistive pressure transducer 10' is illustrated which is similar to the pressure transducer 10 illustrated in FIGS. 1-3. It should be noted that for the pressure transducer 10' in FIGS. 4-6, prime notation for reference numbers is used to identify transducer components generally corresponding to the transducer components shown in FIGS. 1-3. The transducers 10 and 10' are substantially identical except for the differences noted below and/or illustrated in the drawings.

In FIG. 4, a silicon diaphragm 14' is bonded to a glass base 11' by virtue of anodic bonding techniques. While a recessed portion 60' comparable to the recessed portion 60 is provided on a top surface 15' of the diaphragm 14', now a recessed portion 17' is effectively formed in a top surface 12' of the glass base 11' and is separate with respect to a recessed portion 76' corresponding to the recessed portion 76. Thus, a sealed internal cavity 24' in FIG. 4 substantially corresponds to the cavity 24.

In FIGS. 4-6, a hollow electrode 20' now serves no electrical function, but merely provides an inner conduit 50 so as to selectively provide access to the internal cavity 24' to thereby provide any desired reference pressure within the cavity 24'. In addition, a conductor 30', while illustrated as being provided in the transducer 10', provides a connection to the silicon diaphragm 14', wherein as noted previously this connection can be eliminated by virtue of internal connections in the diaphragm 14'.

In FIG. 4, an area 70' is provided within the silicon diaphragm for synthesizing a plurality of semiconductor components which respond to electrical characteristics that are varied in accordance with sensed pressure and provide a pressure related electrical output signal. External access to the components within the area 70' is provided by embedded pins 71'-73' in the same manner as the corresponding embedded pins 71-73 shown in FIGS. 1-3.

The major difference between the transducer 10' in FIGS. 4-6 and the transducer 10 in FIGS. 1-3 is that, instead of two capacitor electrode plates being effectively provided as a pressure sensing element such that a variable capacitance is produced in response to sensed pressure, one or more piezoresistive resistors are provided on the silicon diaphragm wherein resistance changes of these resistors result in the desired electrical output signal. More specifically, piezoresistive resistors 80 and 81 are provided in areas 82 and 83 of the silicon diaphragm 14' illustrated in FIG. 4. Electrical connection to these resistors is provided internal to the diaphragm 14' by virtue of connections 84 illustrated in FIG. 5. These connections 84 can either be conductive paths internal to the diaphragm 14', or metallizations on a bottom surface 16' of the diaphragm 14'. In either event, no lateral metallizations extending from external ambient atmosphere across anodically bonded portions of the diaphragm 14' and glass base 11' are provided wherein these metallizations extend either to the cavity 24' or to critical bonding areas such as the interface between the embedded pins 71'-73' and bonding pads 77' on the silicon diaphragm. Because of this, the ambient atmosphere surrounding the transducer 10' is prevented from unintentionally reaching either the cavity 24' or the bonding interface between the pins 71'-73' and the pads 77'. Of course, it should be noted that, as was the case with the transducer 10, peripheral portions 22' of the glass base top surface 12' are hermetically anodically bonded to associated peripheral portions 18' of the diaphragm bottom surface 16'.

Essentially, the piezoresistive transducer 10' shown in FIGS. 4-6 illustrates another use for the sealed conductor transducer invention illustrated for the transducer 10 shown in FIGS. 1-3. In both cases no degradation of the hermetic seal created by anodic bonding is provided due to lateral metallizations on the diaphragm bottom surface 16' or base top surface 12' extending from areas interior to anodically bonded portions of the diaphragm and base to the external ambient atmosphere. In addition, because of the selection of materials utilized by the present invention, all critical electrical and mechanical interfaces between the diaphragm and base are simultaneously created during the anodic bonding process which also creates the hermetic seal between the diaphragm and the base.

While specific embodiments of the present invention have been shown and described, further modifications and improvements will occur to those skilled in the art. All such modifications of the present invention which retain the basic underlying principles disclosed and claimed herein are within the scope of this invention.

I claim:

1. A pressure transducer comprising:
   a nonconductive base having external top and bottom surfaces, said base top surface having a central area effectively substantially surrounded by nonconductive planar portions of said base top surface;
   a silicon diaphragm, comprising a preformed silicon substrate, having top and bottom surfaces with said diaphragm bottom surface joined to said base top surface surrounding portions, a recessed portion of one of said diaphragm bottom surface and said base top surface spaced apart from and facing the other of said diaphragm bottom surface and said base top surface, a portion of said silicon diaphragm forming at least part of a pressure sensing element movable with respect to said base top surface in response to sensed pressure variations, planar portions of said diaphragm bottom surface and said surrounding planar portions of said base top surface being peripheral to said recessed portion and being anodically bonded together;
   a plurality of semiconductor components, which components respond to changes of said pressure sensing element provided in response to sensed pressure, synthesized in an area of said silicon diaphragm, prior to bonding said silicon substrate to said base, and electrically connected to a plurality of bonding pads provided on said silicon diaphragm bottom surface; and
   a plurality of conductors, each sealed in said base and extending from at least said base top surface surrounding portions bonded to said diaphragm to another base surface, flat end portions of each of said conductors being effectively coplanar with said base top surface surrounding portions and being connected to and contacting associated ones of said pads on said silicon diaphragm, thereby providing external access to said semiconductor component bonding pads from said another base surface via said conductors sealed in said base.

2. A pressure transducer according to claim 1 wherein said conductors comprise solid pins hermetically sealed in said base.

3. A pressure transducer according to claim 2 wherein said flat end portions of said pins form a silicon gold eutectic with said pads during anodic bonding of said diaphragm planar portions to said base top surface planar portions thereby providing said connection therebetween.

4. A pressure transducer according to claim 1 wherein said semiconductor components are provided beneath a critical area of said silicon diaphragm bottom surface, and wherein a recessed portion of said base substrate top surface is provided laterally coextensive with, facing, and at least somewhat larger than said diaphragm surface critical area, said flat ends of said conductors positioned laterally outside of said diaphragm critical area and said base top surface recessed portion.

5. A pressure transducer according to claim 4 wherein said conductors comprise solid pins hermetically sealed in said base.

6. A pressure transducer according to claim 1 wherein said pressure sensing element comprises a capacitor with one capacitor electrode provided on said diaphragm and effectively forming one electrode of a pressure variable capacitor, and another capacitor electrode of said pressure variable capacitor being provided on said base substrate top surface in said central area.

7. A pressure transducer according to claim 6 wherein said recessed portion is provided on said diaphragm bottom surface.

8. A semiconductor assembly according to claim 1 wherein said conductors comprise solid pins hermetically sealed in said base.

9. A semiconductor assembly according to claim 8 wherein said flat end portions of said pins form a silicon gold eutectic with said pads during anodic bonding of said silicon substrate planar portions to said base top surface planar portions thereby providing said connection therebetween.

10. A semiconductor assembly comprising:
    a nonconductive base having external top and bottom surfaces, said base top surface having a central area effectively substantially surrounded by nonconductive planar portions of said base top surface;
    a preformed silicon substrate having top and bottom surfaces with said silicon substrate bottom surface joined to said base top surface surrounding portions, planar portions of said silicon substrate bottom surface and said surrounding planar portions of said base top surface being peripheral to a central anodically bonded together;
    a plurality of semiconductor components synthesized in an area of said silicon substrate, prior to bonding said silicon substrate to said base, and electrically connected to a plurality of bonding pads provided on said silicon substrate bottom surface; and
    a plurality of conductors, each sealed in said base and extending from at least said base top surface surrounding portions bonded to said silicon substrate to another base surface, flat end portions of each of said conductors being effectively coplanar with said base top surface surrounding portions and being connected to and contacting associated ones of said pads on said silicon substrate, thereby providing external access to said semiconductor component bonding pads from said another base surface via said conductors sealed in said base.

11. A semiconductor assembly according to claim 10 wherein said semiconductor components are provided beneath a critical area of said silicon substrate bottom surface, and wherein a recessed portion of said base substrate top surface is provided laterally coextensive with, facing, and at least somewhat larger than said silicon substrate critical area, said flat ends of said conductors positioned laterally outside of said silicon substrate critical area and said base top surface recessed portion.

12. A semiconductor assembly according to claim 11 wherein said conductors comprise solid pins hermetically sealed in said base.

* * * * *

UNITED STATES PATENT AND TRADEMARK OFFICE
CERTIFICATE OF CORRECTION

PATENT NO. : 4,746,893
DATED : May 24, 1988
INVENTOR(S) : Peter I. Shak

It is certified that error appears in the above-identified patent and that said Letters Patent is hereby corrected as shown below:

Claim 10, Col. 10, Line 38 add --portion of said silicon substrate bottom surface and being-- after "central"

In the Abstract, line 7 add --77',-- after "70',"

In the Abstract, line 22 delete "16; 16;" and insert --16; 16'--

Signed and Sealed this

Thirty-first Day of December, 1991

Attest:

HARRY F. MANBECK, JR.

*Attesting Officer*  *Commissioner of Patents and Trademarks*